United States Patent
Snavely et al.

(10) Patent No.: US 8,165,799 B2
(45) Date of Patent: Apr. 24, 2012

(54) TIMED LOCATION SHARING

(75) Inventors: John Snavely, Seattle, WA (US); Kevin Russ, Bellevue, WA (US); Ian Sands, Seattle, WA (US); Russ Burtner, Everett, WA (US)

(73) Assignee: Microsoft Corporation, Redmond, WA (US)

( * ) Notice: Subject to any disclaimer, the term of this patent is extended or adjusted under 35 U.S.C. 154(b) by 377 days.

(21) Appl. No.: 12/471,073

(22) Filed: May 22, 2009

(65) Prior Publication Data

US 2010/0299060 A1 Nov. 25, 2010

(51) Int. Cl.
G01C 21/00 (2006.01)
(52) U.S. Cl. .......................................... 701/400
(58) Field of Classification Search .................... 701/400
See application file for complete search history.

(56) References Cited

U.S. PATENT DOCUMENTS

| | | | |
|---|---|---|---|
| 6,584,401 B2 | 6/2003 | Kirshenbaum et al. | |
| 6,922,566 B2 | 7/2005 | Puranik et al. | |
| 7,219,303 B2 | 5/2007 | Fish | |
| 7,353,034 B2 | 4/2008 | Haney | |
| 7,711,475 B1 * | 5/2010 | Cona et al. | 701/202 |
| 7,847,686 B1 * | 12/2010 | Atkins et al. | 340/539.13 |
| 2002/0055924 A1 | 5/2002 | Liming | |
| 2007/0178908 A1 | 8/2007 | Doyle | |
| 2008/0070593 A1 | 3/2008 | Altman et al. | |
| 2008/0319653 A1 * | 12/2008 | Moshfeghi | 701/208 |
| 2010/0256902 A1 * | 10/2010 | Coch et al. | 701/208 |

OTHER PUBLICATIONS

Vality Technology Delivers High-Powered Geocoding Capabilities; Business Wire. New York: Feb 28, 2000. p. 1; http://proquest.umi.com/pqdweb?did=52487610&sid=4&Fmt=3&clientId=19649&RQT=309&VName=PQD.*
LiveWire Real-Time GPS Tracking Unlimited Use—Fleet Tracking GPS, http://www.brickhousesecurity.com/livewire-lightninggps-trackingdevice.html, 5 pages (Date Printed Jan. 24, 2009).
TeleNav GPS Navigator Sends Current Location and Business Reviews on Mobile Phones, http://www.instagps.com/entry/telenav-gps-navigator-sends-current-location-and-business-reviews-on-mobile-phones/, 2 pages (Date Printed Jan. 24, 2009).

* cited by examiner

*Primary Examiner* — Mila Airapetian
(74) *Attorney, Agent, or Firm* — Merchant & Gould (57) ABSTRACT

Rule-based location sharing may be provided. A location determining device, such as a Global Positioning System (GPS) enabled device, may receive a request to share the location. A rule may be used to determine whether to share the location with the requestor. If the rule allows the location to be shared, the location may be sent to the requestor. The location may be relayed through a third party server, which may be operative to evaluate the rule before sharing the location with the requestor.

20 Claims, 4 Drawing Sheets

TIMED LOCATION SHARING

BACKGROUND

Timed location sharing is a process for providing location sharing among approved users. In some situations, users may wish to share their location with others, such as friends, family, and/or co-workers. For example, co-workers may wish to keep track of each other during a conference weekend. Thus, the conventional strategy is to keep in touch with each other using mobile devices such as cellular telephones. This often causes problems because the conventional strategy requires users to proactively and continuously send each other messages. For example, users may need to make several calls and/or send several messages every time they move to keep others apprised of their location. Other conventional systems may broadcast a user's location, but may have no limitations as to duration, distance, identity, and/or other factors, thus raising privacy concerns.

SUMMARY

Timed location sharing may be provided. This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Rule-based location sharing may be provided. A location determining device, such as a Global Positioning System (GPS) enabled device, may receive a request to share the location. A rule may be used to determine whether to share the location with the requestor. If the rule allows the location to be shared, the location may be sent to the requestor. The location may be relayed through a third party server, which may be operative to evaluate the rule before sharing the location with the requestor.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Rule-based location sharing may be provided. Consistent with embodiments of the present invention, a user may choose to share their location with another individual, group, organization, and/or business. In order to alleviate privacy concerns with unlimited sharing, rules may be used to limit the location sharing according to various criteria such as duration and/or proximity. For example, a user may set up a rule to share their location with selected contacts for a particular duration, such as an hour.

Figure 1:
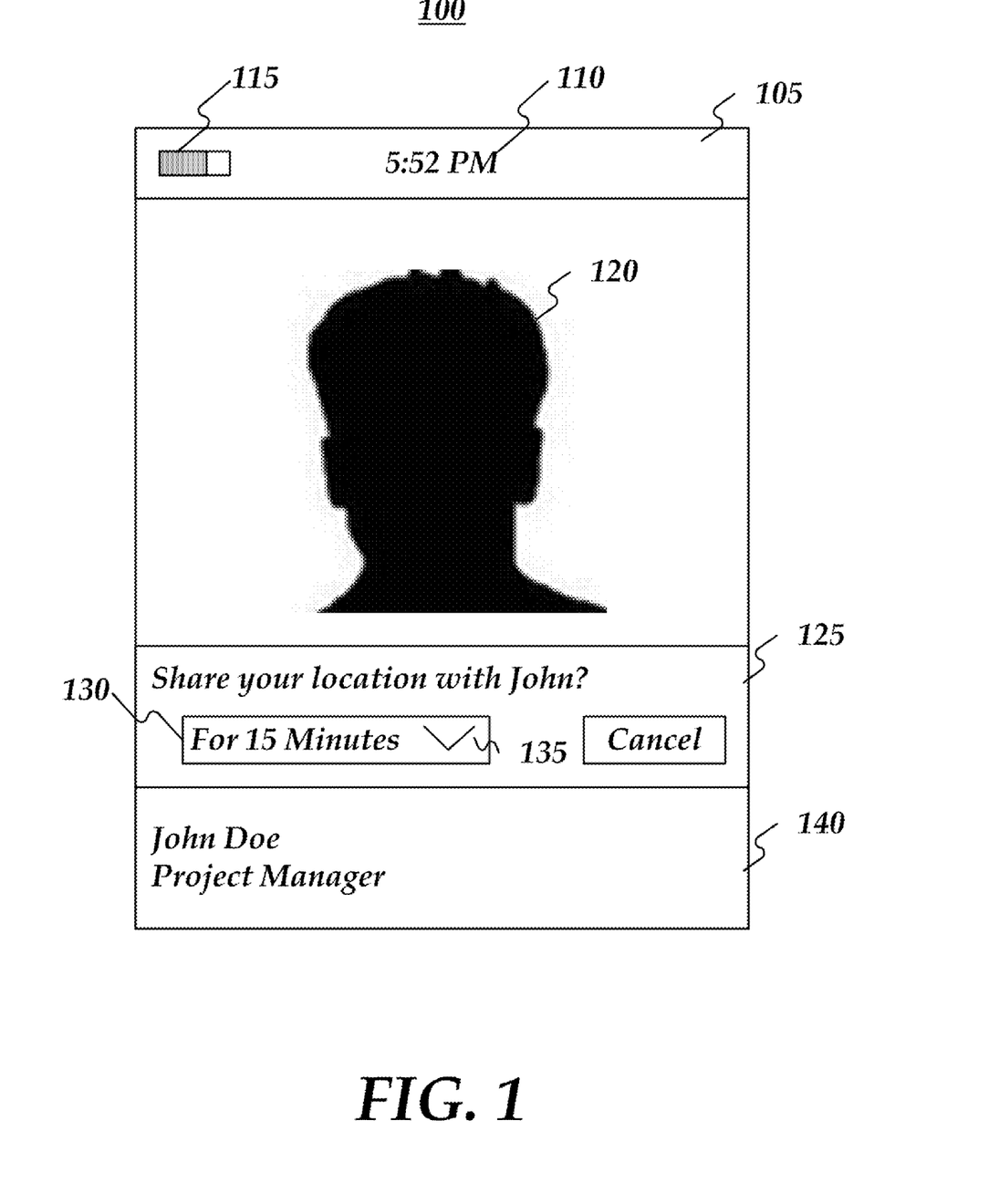
FIG. 1 is a block diagram of a user interface.

FIG. 1 is a block diagram of a user interface (UI) 100 for providing rules-based location sharing. UI 100 may comprise an information bar 105 that may comprise, for example, a current time 110 and a battery status indicator 115. UI 100 may further comprise a main display area 120 and a rule UI 125. Rule UI 125 may comprise a menu 130 and a drop-down icon 135. UI 100 may further comprise a contact information area 140.

Figure 2:
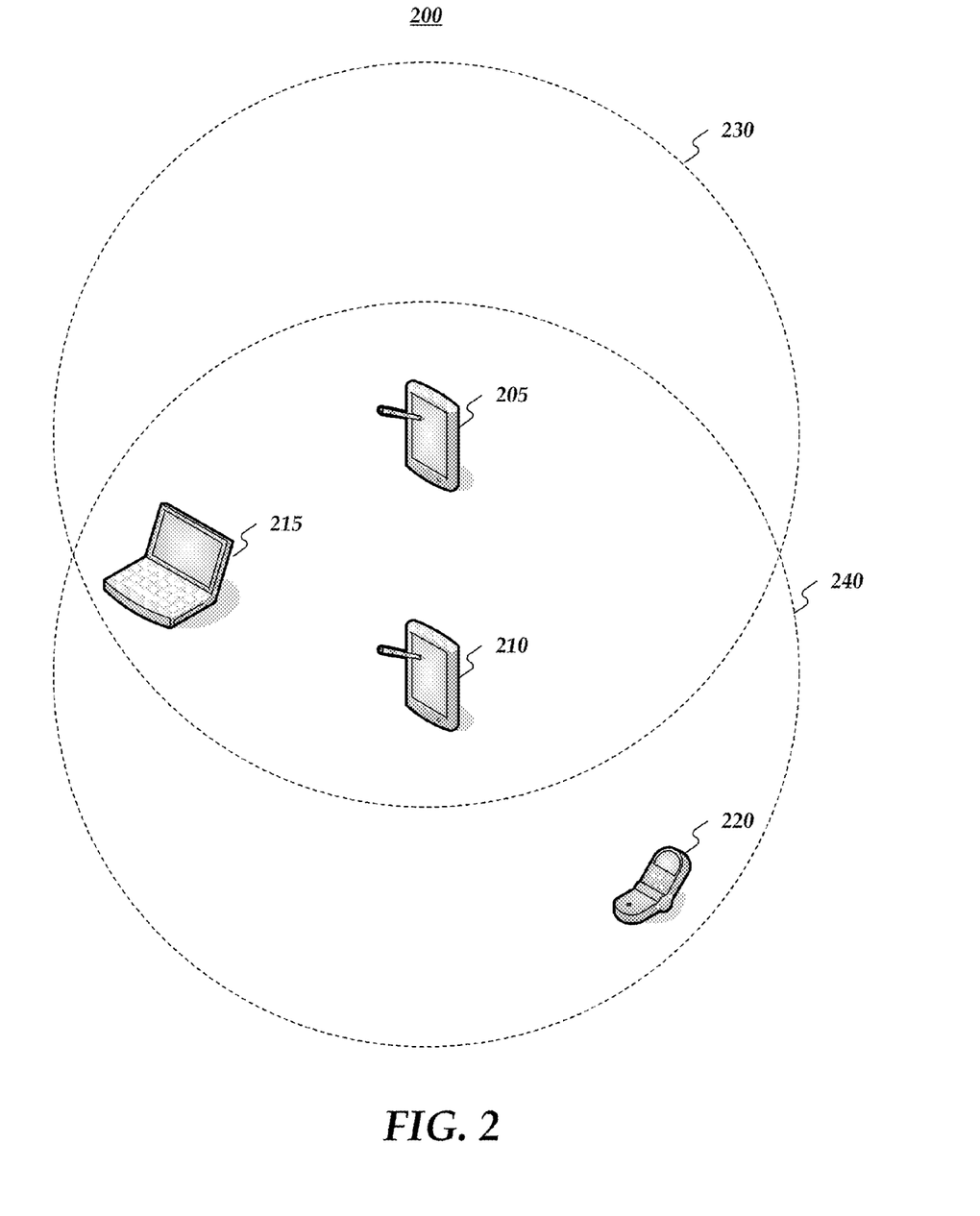
FIG. 2 is an illustration of an operating environment.

FIG. 2 is an illustration of an operating environment 200 for providing rules-based location sharing. Operating environment 200 may comprise a plurality of user devices each operative to determine their current geographic location. Such user devices may include, for example, a first tablet computer 205, a second tablet computer 210, a laptop 215 and a cellular telephone 220. Consistent with embodiments of the invention, each of the plurality of user devices may be operative to send and/or receive a location for at least one of the other user devices. For example, first tablet computer 205 may be operative to determine its current location and may share that current location with second tablet computer 210. The user devices may be equipped with modules for determining location, such as a Radio Frequency Identification (RFID) tag, a Global Positioning System (GPS) or a cellular location system.

Radio-frequency identification (RFID) may comprise the use of an object applied to and/or incorporated into a product, animal, and/or person for the purpose of identification and tracking using radio waves. Some tags may be read from several meters away and beyond the line of sight of the reader. RFID tags may comprise an integrated circuit for storing and processing information, modulating and demodulating a radio-frequency (RF) signal, and other specialized functions. RFID tags may also comprise an antenna for receiving and transmitting the signal. RFID tags may comprise active RFID tags, which may comprise a battery and may transmit signals autonomously, and passive RFID tags, which have no battery and may require an external source to provoke signal transmission.

GPS is a global navigation satellite system (GNSS) developed by the United States Department of Defense and managed by the United States Air Force. It may be used freely, and may be used by civilians for navigation purposes. A GPS navigation device may comprise a device that receives GPS signals for determining a present position. The GPS navigation device may calculate its position by precisely timing the signals sent by the GPS satellites high above the Earth. Each satellite continually transmits messages containing the time the message was sent, precise orbital information, and the general system health and rough orbits of all GPS satellites. The GPS navigation device may measure the transit time of each message and may compute the distance to each satellite.

Geometric trilateration may be used to combine these distances with the location of the satellites to determine the device's location.

Cellular location systems may include systems operative to locate a device comprising a cellular radio based on a communication with a cellular network antenna. The communication can be analyzed according to various algorithms such as time difference of arrival (TDOA), time of arrival (TOA), and/or angle of arrival (AOA). In the TDOA algorithm, the network may determine the time difference and therefore the distance from each base station to a mobile phone. The TOA algorithm may use the absolute time of arrival at a certain base station rather than the difference between two stations. The AOA algorithm may locate the device at the point where the lines along the angles from multiple base stations intersect. Cell of Origin (COO) positioning may determine a device's location according to the location of a base station that receives an outgoing communication from the device.

The plurality of devices may be operative to share their identified location with at least one other of the plurality of user devices. Consistent with embodiments of the invention, each of the plurality of user devices may be operative to send its location to a server operative to relay that location to one and/or more of the other devices. For example, first tablet computer 205 and second tablet computer 210 may each send their identified location to laptop 215. Laptop 215 may then send the location of first tablet computer 205 to second tablet computer 210 and/or cellular telephone 220. Consistent with further embodiments of the invention, a user device may be operative to send its location to other user devices within a given range. For example, first tablet computer 205 may establish a five mile radius 230 centered on the device and may send its location to second tablet computer 210 and laptop 215 within radius 230. Second tablet computer 210 may establish a five mile radius 240 centered on the device and may send its location to first tablet computer 205, laptop 215 and cellular telephone 220. Second tablet computer 210 may relay a location received from first tablet computer 205 to a device outside of radius 230, such as cellular telephone 220.

Figure 3:
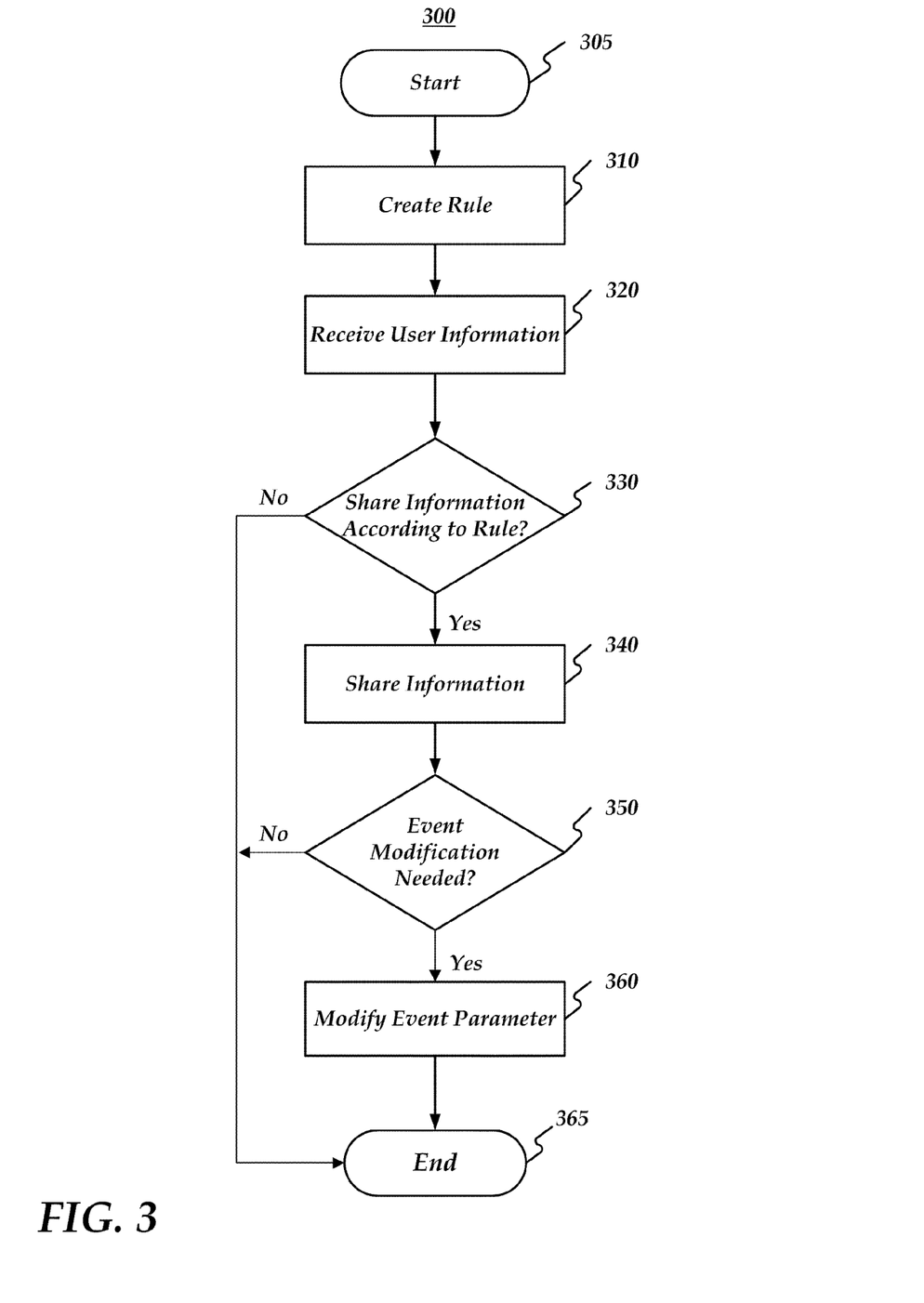
FIG. 3 is a flow chart of a method for providing timed location sharing.

FIG. 3 is a flow chart setting forth the general stages involved in a method 300 consistent with an embodiment of the invention for providing rule-based location sharing. Method 300 may be implemented using a computing device 400 as described in more detail below with respect to FIG. 4. Ways to implement the stages of method 300 will be described in greater detail below. Method 300 may begin at starting block 305 and proceed to stage 310 where computing device 400 may create a rule. For example, a user may select a contact via UI 100 with whom to share their location for a certain restricted duration, such as 15 minutes. Consistent with embodiments of the invention, the user may create a rule allowing their location to be shared with any and/or all contacts, such as all members of a group of contacts, employees of a company, or contacts affiliated with an organization. The rule may comprise, for example, a parameter restricting sharing of the user's information according to a time duration, a distance and/or proximity to another user, and/or a distance and/or proximity to another location.

From stage 310, where computing device 400 created the rule, method 300 may advance to stage 320 where computing device 400 may receive information about the user. For example, cellular telephone 220 may receive a current location from a GPS component of cellular telephone 220. Consistent with embodiments of the invention, a device such as laptop 215 may receive information, such as a location for cellular telephone 220, from a user.

Once computing device 400 receives the user information in stage 320, method 300 may continue to stage 330 where computing device 400 may determine whether to share the information according to the rule. For example, the rule may comprise a parameter allowing the user's location to be shared for fifteen minutes. Information received within that fifteen minute window may be shared while information received after that window may not be shared. Consistent with embodiments of the invention, a user may be notified when a rule allowing information to be shared is about to expire. For example, one minute before a fifteen minute sharing rule expires, the user may be notified via a message on the device. Further consistent with embodiments of the invention, the notification may comprise a request to extend and/or modify the rule. For example, a user may be provided with the option to renew the location sharing rule for another fifteen minutes.

If, at stage 330, computing device 400 determines that the information should not be shared, method 300 may end at stage 365. Otherwise, method 300 may advance to stage 340 where the information may be shared. For example, cellular telephone 220 may send its location to second tablet computer 210. Second tablet computer 210 may receive the information and display it to a user, such as by displaying a map with an icon indicating the location of cellular telephone 220.

After computing device 400 shares the information in stage 330, method 300 may proceed to stage 350 where computing device 400 may determine whether an event associated with the rule and/or a user should be modified according to the received information. For example, the location sharing rule may be associated with a scheduled occurrence that may be modified according to a user's shared location. For example, a rule may be created to share the location of a plurality of meeting attendees with each other. The attendees' locations may be received by computing device 400 and evaluated to determine whether a parameter of the event, such as a start time, a meeting location, and/or an attendee list, should be modified based on the user's location.

If, at stage 350, computing device 400 determines that the event should not be modified, method 300 may end at stage 365. Otherwise, method 300 may advance to stage 360 where computing device 300 may modify a parameter associated with the event. For example, a meeting start time may be changed if one and/or more attendees have not arrived at the meeting location by the scheduled start time. For another example, a meeting location may be relocated to a new location more convenient to at least one attendee's current location. For yet another example, a meeting attendee list may be updated, such as by marking an attendee as absent based on their received location during the meeting time.

Once computing device 400 modifies the event parameter in stage 340, method 300 may then end at stage 350.

A rule may restrict sharing of the user's information to a current location and/or a previous location. For example, the user's device may allow the calculation of a route from a first location to a second location and the rule may share the user's progress along the route comprising previous locations along the route and/or the user's present location. Consistent with embodiments of the invention, the projected future route may also be shared. The rule may restrict sharing such that the user's location is only shared while within a certain proximity of the projected route. For example, the user's location may only be shared while the user is within a mile of the route, but may stop sharing if the user deviates from the route by more than a mile. The rule may restrict location sharing until the user arrives at the endpoint of the route; once the user arrives, location sharing may cease. Alternately, the rule may not allow location sharing until after the user arrives at a location, such as the route's endpoint.

The user's device, such as cellular telephone 220, may be operative to determine a distance between the device's current location and a second location and calculate a travel time for the device to arrive at the second location. The calculation may be based, for example, on an average speed of the device's movement and/or a baseline average, such as 3 miles per hour for a person on foot or 60 miles per hour for a car traveling on a highway.

Any number of rules may be created a proximity to a person or location. For example, a user device associated with a child may give the child freedom to roam within a certain radius, such as a neighborhood, of a second user device associated with a parent. If the child leaves that proximity, the child's device may provide an indicator disclosing sharing and/or privacy options such as informing the child that if they proceed, their information may be shared with their parent. Once outside the radius, location sharing may cease according to a rule, such as if the child arrives at a known location (e.g. a relative's house).

Further consistent with embodiments of the invention, rules may be created that restrict sharing of a user's location if the user is within a certain proximity of another user and/or another location. For example, an attendee at a meeting may create a rule operative to share their location with other attendees of the meeting while the attendee is within a geographic boundary comprising an office building. The shared location may comprise the attendees physical location and may be shared by indicating that location on a map display provided by a device used by one of the other attendees. The sharing attendee's location may also be provided to recipients in the form of an estimated time of arrival at a particular location, such as a recipient's current location and/or a location for the meeting, such as a conference room. The rule may disable sharing of the attendee's location if they are in proximity to certain other locations, such as a restroom. Alternately, an estimated time of travel between the attendee's location and a second location and/or an estimated time of arrival may be shared while in proximity to such a location.

Rules may be created by a user on a device associated with the user. For example, a user may use UI 100 to create a location sharing rule on cellular telephone 220. Consistent with embodiments of the invention, rules may be created on a separate device, such as laptop 215 and/or another computing device, and transmitted to a user's device. The user's device may then be operative to determine its location and whether or not to share its location according to the received rule. For example, a server computer used by a restaurant may create a rule for a diner who makes a reservation that shares the diner's location until the reservation time arrives, the diner arrives, and/or the reservation is canceled. The rule may be transmitted to the diner's device, such as cellular telephone 220, and the device may request permission from the diner to enable the location sharing rule.

An embodiment consistent with the invention may comprise a system for providing rule-based location sharing. The system may comprise a memory storage and a processing unit coupled to the memory storage. The processing unit may be operative to receive a request to share a location of a device operative to determine a geographic location, associate at least one restriction with the request to share the location, determine whether the at least one restriction is satisfied, and in response to determining that the at least one restriction is satisfied, share the location of the device.

Another embodiment consistent with the invention may comprise a system for providing rule-based location sharing. The system may comprise a memory storage and a processing unit coupled to the memory storage. The processing unit may be operative to create a rule associated with a first user, receive a location associated with the first user, determine whether the location associated with the first user should be shared with at least one second user according to the rule, and in response to determining that the location associated with the first user should be shared with at least one second user according to the rule, share the location with the at least one second user.

Yet another embodiment consistent with the invention may comprise a system for providing rule-based location sharing. The system may comprise a memory storage and a processing unit coupled to the memory storage. The processing unit may be operative to create a rule associated with a first user, receive information associated with the first user, determine whether to share the information associated with the first user with at least one second user according to the rule associated with the first user, share the location with the at least one second user, determine whether to modify the scheduled event according to the information associated with the first user; and modify at least one parameter of the scheduled event, wherein the at least one parameter comprises at least one of the following: a time of the scheduled event, a location of the scheduled event, and an attendee list of the scheduled event.

The rule may comprise at least one parameter comprising at least one of the following: a duration, a distance from at least one other user, and a distance from at least one other location. The information may comprise at least one of the following: a location of the first user, a distance of the location of the first user from the at least one other location, an estimated time of arrival of the first user at the at least one other location, and a proximity of the first user to the at least one other user.

Figure 4:
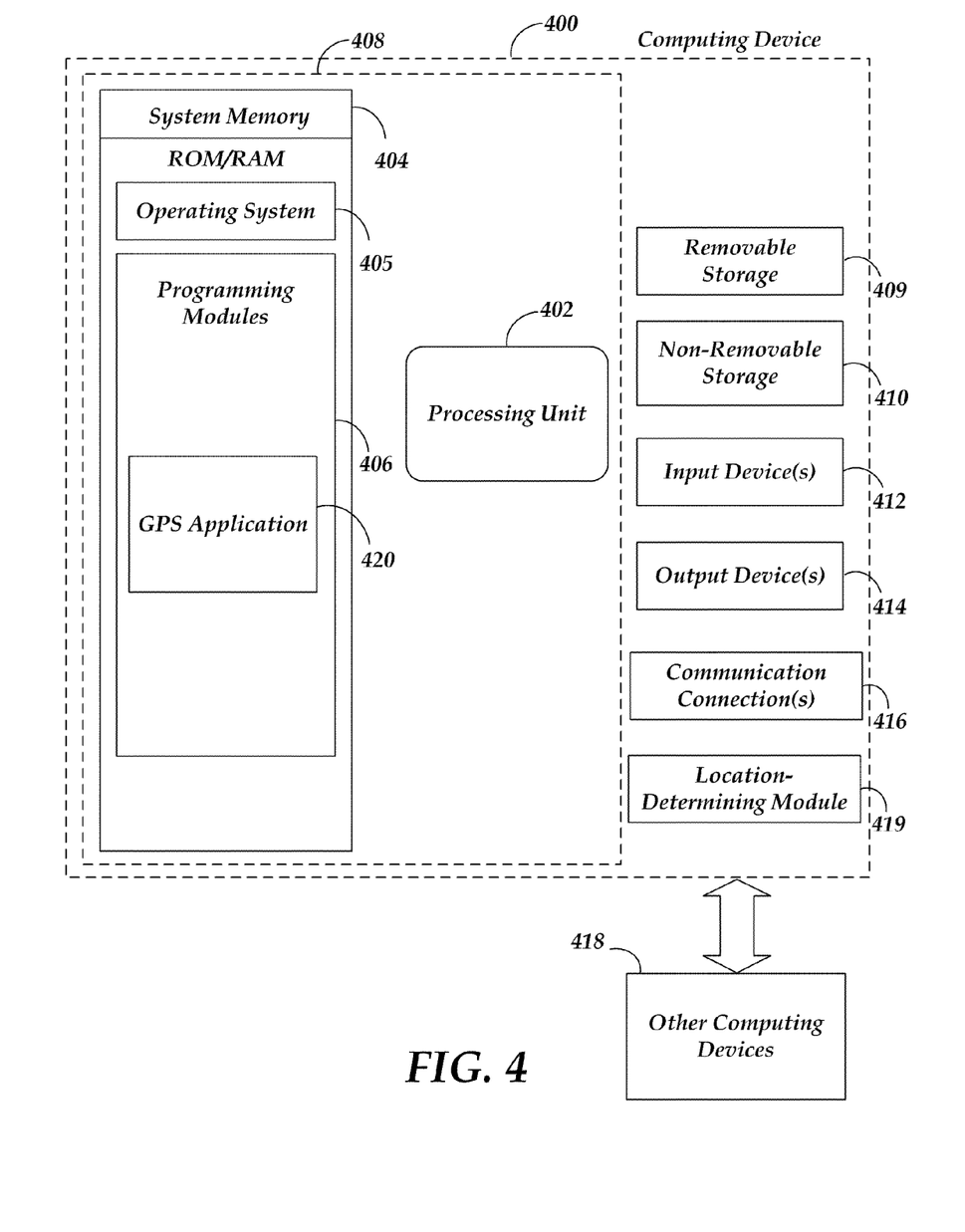
FIG. 4 is a block diagram of a system including a computing device.

FIG. 4 is a block diagram of a system including computing device 400. Consistent with an embodiment of the invention, the aforementioned memory storage and processing unit may be implemented in a computing device, such as computing device 400 of FIG. 4. Any suitable combination of hardware, software, or firmware may be used to implement the memory storage and processing unit. For example, the memory storage and processing unit may be implemented with computing device 400 or any of other computing devices 418, in combination with computing device 400. The aforementioned system, device, and processors are examples and other systems, devices, and processors may comprise the aforementioned memory storage and processing unit, consistent with embodiments of the invention. Furthermore, computing device 400 may comprise an operating environment for system 100 as described above. System 100 may operate in other environments and is not limited to computing device 400.

With reference to FIG. 4, a system consistent with an embodiment of the invention may include a computing device, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include operating system 405, one or more programming modules 406, and may include a GPS/Navigation application 420. Operating system 405, for example, may be suitable for controlling computing device 400's operation.

In one embodiment, programming modules 406 may include GPS/Navigation application 420 operative to communicate with a location-determining module 419. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, etc. Output device(s) 414 such as a display, speakers, a printer, etc. may also be included. The aforementioned devices are examples and others may be used.

Computing device 400 may also contain a communication connection 416 that may allow device 400 to communicate with other computing devices 418, such as over a network in a distributed computing environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 404, including operating system 405. While executing on processing unit 402, programming modules 406 (e.g. GPS/Navigation application 420) may perform processes including, for example, at least one of method 300's stages as described above. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing rule-based location sharing, the method comprising:
   receiving a request to share a location of a device operative to determine a geographic location;
   associating at least one restriction with the request to share the location;
   determining by a computer whether the at least one restriction is satisfied; and
   in response to determining that the at least one restriction is satisfied, sharing the location of the device, the location being shared by:
   calculating a route from a first location to a second location for the device, the second location comprising a route endpoint; and
   sharing a progress of the device along the route including previous locations of the device and a current location of the device.

2. The method of claim 1, wherein sharing the location comprises:
   transmitting the location of the device to a server; and
   sending the location of the device from the server to at least one second device.

3. The method of claim 1, wherein the at least one restriction comprises a time duration.

4. The method of claim 1, wherein the at least one restriction comprises at least one selected receiver of the location.

5. The method of claim 1, wherein the at least one restriction comprises a proximity to at least one of the following: a geographic location and a second device.

6. The method of claim 1, wherein sharing the location comprises:
   determining, according to a distance between the location of the device and at least one second location, a travel time for the device to arrive at the at least one second location.

7. The method of claim 6, wherein determining the travel time comprises determining the travel time according to an average speed of movement of the device.

8. The method of claim 1, wherein sharing the location of the device further comprises sharing a projected future route for the device, the at least one restriction comprising only sharing the location of the device when the device is within a certain proximity of the projected future route, the projected future route comprising the route endpoint.

9. A computer storage device which stores a set of instructions which when executed by a computer performs a method for providing rule-based location sharing, the method executed by the set of instructions comprising:
   receiving a request to share a location of a device operative to determine a geographic location;
   associating at least one restriction with the request to share the location;
   determining whether the at least one restriction is satisfied; and
   in response to determining that the at least one restriction is satisfied, sharing the location of the device, the location being shared by:
   calculating a route from a first location to a second location for the device, the second location comprising a route endpoint;
   sharing a progress of the device along the route including previous locations of the device and a current location of the device; and
   sharing a projected future route for the device, the at least one restriction comprising only sharing the location of the device when the device is within a certain proximity of the projected future route, the projected future route comprising the route endpoint.

10. The computer storage device of claim 9, wherein sharing the location further comprises:
    transmitting the location of the device to a server; and
    sending the location of the device from the server to at least one second device.

11. The computer storage device of claim 9, wherein the at least one restriction further comprises a time duration.

12. The computer storage device of claim 9, wherein the at least one restriction further comprises at least one selected receiver of the location.

13. The computer storage device of claim 9, wherein the at least one restriction further comprises a proximity to at least one of the following: a geographic location and a second device.

14. The computer storage device of claim 9, wherein sharing the location further comprises:
    determining, according to a distance between the location of the device and at least one second location, a travel time for the device to arrive at the at least one second location.

15. The computer storage device of claim 14, wherein determining the travel time comprises determining the travel time according to an average speed of movement of the device.

16. A system for providing rule-based location sharing, the system comprising:
a memory storage; and
a processing unit coupled to the memory storage, wherein the processing unit is operative to:
receiving a request to share a location of a device operative to determine a geographic location;
associate at least one restriction with the request to share the location;
determine whether the at least one restriction is satisfied; and
in response to determining that the at least one restriction is satisfied, share the location of the device, the processing unit being further operative to:
transmit the location of the device to a server;
send the location of the device from the server to at least one second device;
calculate a route from a first location to a second location for the device, the second location comprising a route endpoint;
share a progress of the device along the route including previous locations of the device and a current location of the device; and
share a projected future route for the device, the at least one restriction comprising only sharing the location of the device when the device is within a certain proximity of the projected future route, the projected future route comprising the route endpoint.

17. The system of claim 16, wherein the at least one restriction further comprises a time duration.

18. The system of claim 16, wherein the at least one restriction further comprises at least one selected receiver of the location.

19. The system of claim 16, wherein the at least one restriction further comprises a proximity to at least one of the following: a geographic location and the second device.

20. The system of claim 16, wherein the processing unit is further operative to determine, according to a distance between the location of the device and at least one second location, a travel time for the device to arrive at the at least one second location, wherein determining the travel time comprises determining the travel time according to an average speed of movement of the device.

* * * * *